United States Patent [19]
Gadkaree et al.

[11] Patent Number: 5,510,063
[45] Date of Patent: Apr. 23, 1996

[54] METHOD OF MAKING ACTIVATED CARBON HONEYCOMBS HAVING VARYING ADSORPTION CAPACITIES

[75] Inventors: Kishor P. Gadkaree, Big Flats; Joseph F. Mach, Lindley, both of N.Y.

[73] Assignee: Corning Incorporated, Corning, N.Y.

[21] Appl. No.: 228,198

[22] Filed: Apr. 15, 1994

[51] Int. Cl.⁶ .......................... C01B 31/00; B29C 43/18
[52] U.S. Cl. .................. 264/29.7; 55/DIG. 5; 95/901; 210/500.27; 264/29.6; 264/DIG. 48; 423/447.8
[58] Field of Search .................. 264/29.1, 29.5, 264/29.7, 122, 29.6, DIG. 48; 428/116; 210/500.27; 95/901; 55/DIG. 5; 423/447.8

[56] References Cited

U.S. PATENT DOCUMENTS

| | | |
|---|---|---|
| 3,825,460 | 7/1974 | Yoshikawa et al. |
| 3,922,412 | 11/1975 | Yoshikawa et al. |
| 4,399,052 | 8/1983 | Sugino. |
| 4,518,704 | 5/1985 | Ikabayashi et al. ............... 428/116 |
| 4,686,072 | 8/1987 | Fukuda et al. ................... 264/29.7 |
| 4,956,131 | 9/1990 | Shigeta et al. ................... 264/29.7 |

*Primary Examiner*—Mathieu D. Vargot
*Attorney, Agent, or Firm*—L. Rita Quatrini

[57] ABSTRACT

An activated carbon body having flow-through channels and method of making the body. The method involves combining and shaping channel-forming material and optionally fugitive pore-forming material and non-fugitive support material, and a crosslinkable resin into a green body and curing the resin. The temperature at which the channel-forming material begins to distort is greater than the curing temperature of the resin. The resin is carbonized and at the same time the channel-forming material is vaporized out to form a carbon body having flow through channels in the configuration of the fugitive material. The carbon body is then activated. Among other shapes the channels can be straight, curved or crisscrossed.

17 Claims, 3 Drawing Sheets

METHOD OF MAKING ACTIVATED CARBON HONEYCOMBS HAVING VARYING ADSORPTION CAPACITIES

This invention relates to activated carbon bodies in the shape of honeycomb structures. The honeycombs are made by contacting a crosslinkable resin with channel-forming material and optionally with pore-forming and/or support fillers, shaping, curing, carbonizing, and activating. The channel-forming material breaks down into low molecular weight components in inert atmosphere at high temperatures, leaving behind the honeycomb channels. These bodies are strong and are not subject to attrition as are granulated carbon beds. The bodies have continuous flow paths for minimizing pressure drop in a flow stream. The configuration of the channels, and hence the adsorption capacity can be controlled by selection of suitable size and shape channel-forming material as well as percentage of pore-forming and support fillers. Therefore the bodies can be suited to a wide variety of adsorption applications.

BACKGROUND OF THE INVENTION

Activated carbon materials in the form of granules or powders are used for a variety of pollution control applications. Pollutants in liquid or gas streams are removed by contacting the stream with activated carbon in granulated or powdered form. The fine angstrom size pore structure of activated carbon enables adsorption of the impurities out of the process streams. The pores in activated carbon which impart the unique ability to adsorb the pollutants even at very low concentrations (e.g., as low as 1 ppm) are in the 5 to 20 angstrom range. Pores above about 50 angstroms do not contribute significantly to adsorption at low concentrations.

Although activated carbon is used in many pollution control applications, in the form of pellets or powder, a major disadvantage with this form of carbon is the high pressure drop associated with packed beds of pellets or powder. Another problem is that of entrainment of the powder in the flow stream and attrition of the granules. One way around this problem is to form the activated carbon in the shape of a honeycomb. The honeycomb geometry has the advantage of high geometric surface area available for contact and low pressure drop across the bed. In some industrial processes honeycomb geometries are necessary.

Resins have been used in making carbon bodies both as binders and as carbon precursors. For example, phenolic resins are extruded into honeycomb shapes as in U.S. Pat. No. 4,399,052. The resin is cured, carbonized, and activated. A major difficulty with such a product is that during carbonization when about 50 wt. % is lost, such bodies distort and crack in many cases.

All of the above difficulties are overcome by the process of coating a porous ceramic honeycomb body with a thermosetting resin, and then carbonizing and activating. Such products are described in U.S. application Ser. No. 08/11, 385, filed Jan. 29, 1993. The drawbacks associated with this process are the cost of first extruding and then firing a ceramic honeycomb and then coating, curing, and activating. Secondly the amount of resin and hence the amount of carbon that can be put on the body is limited, thus limiting its capacity.

Methods of making shapes by dipping rods or cylinders in resin and then forming honeycombs by removing the rods after curing the resin as in U.S. Pat. Nos. 3,825,460 and 3,922,412, again are subject to the same type of problems such as warping and cracking as the bodies formed by extrusion of resin.

It would be highly desirable to have a method in which the adsorption capacity per unit volume can be controlled so that it can be made to fit the requirements of a specific application and at the same time exhibit properties in the body of no attrition, minimized pressure drop, and high surface area in a given volume.

The present invention provides such a carbon structure and a method of making it.

SUMMARY OF THE INVENTION

In accordance with one aspect of the invention, there is provided an activated carbon body having flow-through channels. Among other shapes the channels can be straight, curved or crisscrossed.

In accordance with another aspect of the invention, there is provided a method for making an activated carbon body having flow-through channels. The method involves combining and shaping channel-forming material and optionally fugitive pore-forming material and non-fugitive support material, a crosslinkable resin into a green body and curing the resin. The temperature at which the channel-forming material begins to distort is greater than the curing temperature of the resin. The resin is carbonized and at the same time the channel-forming material is vaporized out to form a carbon body having flow through channels in the configuration of the fugitive material. The carbon body is then activated.

DETAILED DESCRIPTION OF THE INVENTION

Figure 1:
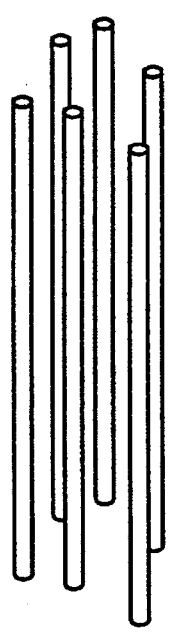
FIG. 1 shows an array of channel forming elements in the form of straight solid filaments.

The present invention relates to carbon bodies or structures for which the adsorption capacity per unit volume can be controlled, that is, can be made to be low, intermediate or high depending on what the specific application requires. The structure also eliminates problems such as attrition associated with granulated beds, and the pressure drop is lower than in granulated beds.

The carbon body is characterized by a honeycomb structure, that is, having flow-through channels for optimum flowability of a work stream therethrough; and angstrom sized pores (about 5 to about 50 angstroms for adsorption). The channels can be straight and/or curved. The channels can be essentially parallel, and/or non-parallel, and/or criss-crossing. The structure exhibits high strength.

The bodies of the present invention are suited for use in any of a wide variety of applications for which activated carbon bodies have been used in the past. Examples of such applications include residential water purification, volatile organic compound emission control, natural gas fuel storage for gas-powered vehicles or equipment, indoor air purification, industrial respirators, automotive cabin air filters, ventless hoods, chemical separations, $NO_x$ and $SO_x$ control, and exhaust traps for automotive cold start applications. Other potential applications include use as ozone filters, mercury collection from municipal incinerators, radon adsorption, automotive gas tank or intake manifold emissions, sewer pump vents, oil-air separations, or any other application wherein adsorption of a component or components from a fluid stream containing multiple components is desired.

The method for making the structures involves contacting a continuous fugitive material or channel-forming material with a crosslinkable resin and optionally with what will be called fillers. The fillers can be non-fugitive or support material to enhance strength of the body, and/or non-continuous fugitive or pore-forming material which forms wall porosity during carbonization. The mixture is then shaped into a form by a non-extrusion process. The form is then dried, and the resin is cured and carbonized to produce a carbon body. After the drying step, the form can be further shaped if necessary. During carbonization, the fugitive materials vaporize. The channel-forming material leaves behind channels which are essentially in the same shape as they were in the pre-carbonized form. The pore-forming material, if present leaves behind wall porosity. The carbonized body is then activated to produce the final activated carbon body.

The resin content determines the total amount of carbon in the body structure. The size, shape and weight percent of channel-forming and pore-forming material determines the surface area of the carbon available for activation which in turn determines the adsorption capacity. Support material controls the strength and cost of the body.

The adsorption capacity is controlled by the amount of carbon present in the final body structure and the percentage of this carbon available for activation. The percentage of carbon available for activation is determined by the available surface area for the activation reaction. The available surface area in turn is determined by the channel-forming and pore-forming material. If surface area is increased excessively then the structure can become weak. The support fillers enhance strength and allow maximization of surface area. The method of the present invention allows control of surface area available for adsorption for a given weight of carbon.

The Resin

A critical characteristic of the resin is that it be crosslinkable. These resins form three-dimensional network structures extending throughout the final body. The final body is stable to heat and cannot be made to melt or flow. Examples of resins that can be considered suitable to the practice of the present invention are the thermosetting resins such as phenolics, furan, epoxies, and thermoplastic polymers such as polyacrylonitrile, polyvinyl chloride, etc., which although not thermosetting, can be crosslinked by high temperature oxidation. It is desirable that the resin give a high carbon yield on carbonization, that is, for example at least about 25%, and preferably at least about 40% based on the amount of cured resin. Thermosetting resins normally give these high yields. Thermosetting resins are the preferred resins. Examples of thermosetting resins that can be used in the practice of the present invention are phenolics, furan, epoxies, and combinations of these. Preferred resins are phenolics, furan, and combinations of these because of their high carbon yield and low viscosities at room temperature. Normally, the viscosities can vary from about 50 cps to about 1000 cps. The preferred viscosities are about 100 to about 500 cps. The resins can be provided as solids, liquids, solutions, or suspensions.

One resin that is especially suited to the practice of the present invention is phenolic resole. The phenolic resoles are solutions of phenolics in water. A higher viscosity suspension of solid phenolic powder in liquid resin can be used to increase the amount of resin in the support material (when used) and thus the final carbon yield. One especially suited resin is a phenolic resole resin available from Occidental Chemical Corporation, Niagara Falls, N.Y. under the product name of Plyophen 43290. According to OxyChem® Material Safety Data Sheet No. M26359, Plyophen 43290 is a liquid one step phenolic resin containing phenol, formaldehyde, and water, having a specific gravity of 1.22–1.24, a boiling point >100° C. and a pH of 7.5–7.7@100 gm/l.

Furan resins are available as liquids. One furan that is suitable to the practice of the present invention is supplied by QO Chemicals, Inc. under the name of Furcarb® LP. According to the Material Safety Data Sheet by QO Chemicals, Inc., Furcarb® LP resins preparations of phenol (4% max) in furfuryl alcohol, and have a specific gravity of 1.2, and a boiling point of 170° C. The viscosity is 300 cps .

The Channel-forming Material

The channel-forming material volatilizes and leaves very low or no residue at the temperatures of the present invention. For example, the material breaks down into low molecular weight volatile compounds during firing in an inert atmosphere leaving very little or no residue.

The channel-forming material must have a heat distortion temperature point which is greater than the curing temperature of the resin that is used so that it does not distort during the curing process. This is typically but not necessarily at least about 150° C. which is the cure temperature for phenolic resins.

The channel-forming material is continuous, that is, filament or fiber-like and is of sufficient length to provide on its volatilization, low pressure drop paths or channels through which a work stream can pass in continuous uninterrupted flow through the body; as opposed to wall porosity.

The channel-forming material can be in any form that will provide these low pressure drop paths, such as fibers. For example, the fibers can be in the form of a plurality or array of loose fibers or filaments, or in the form of a very long monofilament which is wound in a given configuration with the length and diameter being chosen depending on the amount and configuration of porosity that is desired. The fibers can range typically from about 1 micrometer or less in diameter to as much as ½ centimeter or 1 centimeter or more in diameter depending on the application. The fibers can be solid or hollow with commercial plastic straws being one example of the latter. The fibers can also be preformed into a shape such as woven or non-woven (fused) mats or screens, etc.

FIGS. 1, 2, 3, 7, and 8 show some common shapes of channel-forming materials used in the practice of the present invention and hence, the configurations of channels in the bodies of the present invention.

Figure 2:
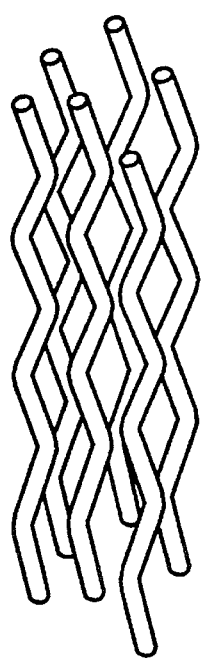
FIG. 2 shows an array of channel forming elements in the form of curved solid filaments.
Figure 3:
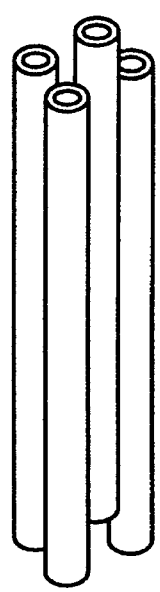
FIG. 3 shows an array of channel forming elements in the form of straight hollow tubes.

FIGS. 1, 2, and 3 show fiber-like materials.

An array of channel forming elements in the form of loose straight solid filaments is shown in FIG. 1.

An array of channel forming elements in the form of loose curved solid filaments is shown in FIG. 2.

An array of channel forming elements in the form of loose straight hollow tubes is shown in FIG. 3.

Figure 7:
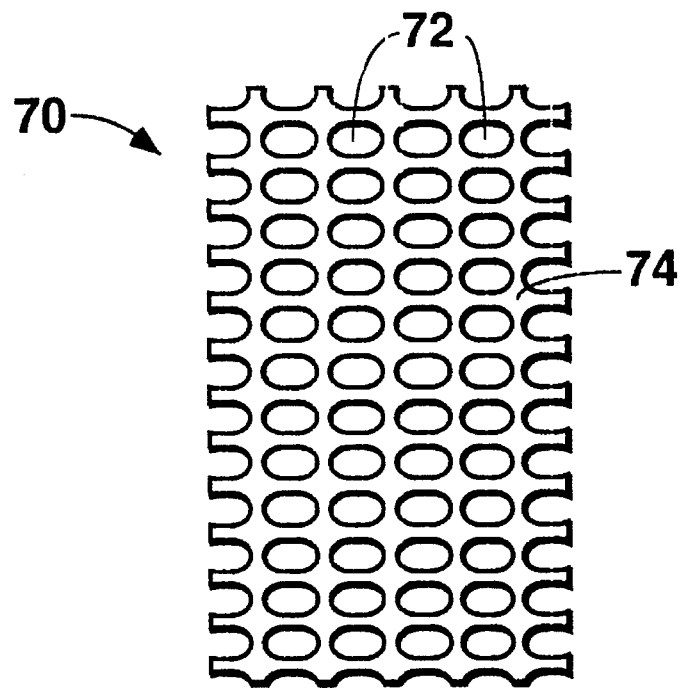
FIG. 7 shows channel-forming material in the form of a fused screen.
Figure 8:
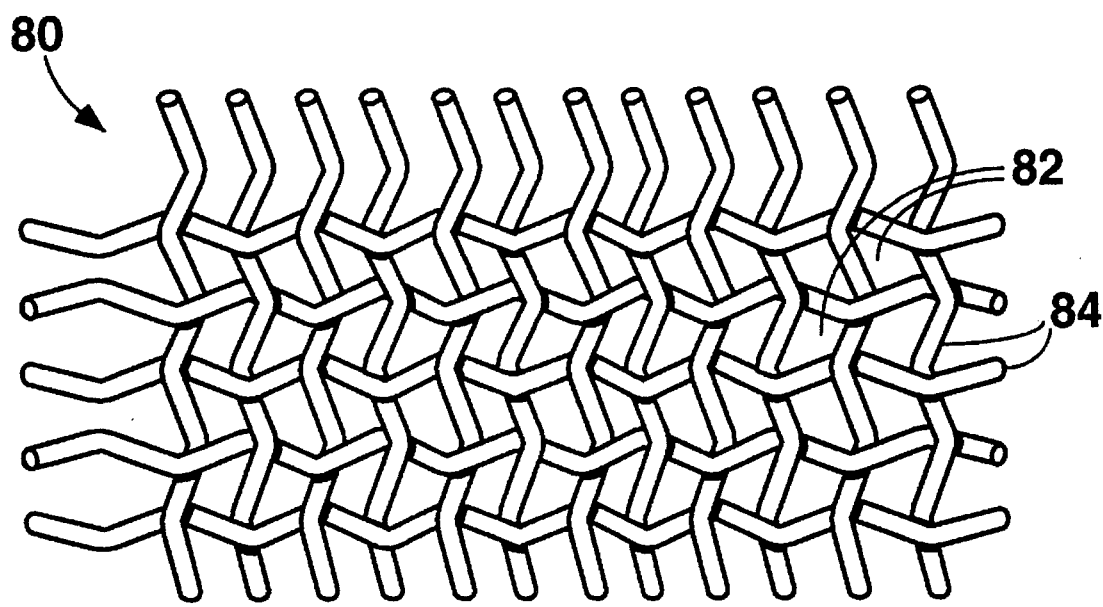
FIG. 8 shows channel-forming material in the form of a woven screen.

FIG. 7 and 8 show preformed shapes.

FIG. 7 shows a fused screen (70) in which after carbonization the openings (72) between the screen area (74) will be the carbon while area (74) will form the channels.

FIG. 8 shows a woven screen (80) in which after carbonization the openings (82) between the screen area (84) will be the carbon while area (84) will form the channels.

Since the flow-through channels of the body take on the shape of the fugitive material in the pre-carbonized body, the fugitive material is preferably non-wettable by the resin liquid, solution or suspension in order that channels of clean and defined shape will form on vaporization.

Therefore, the nature, amount, size, and shape of the continuous fugitive material are chosen depending on the desired degree and configuration of channels desired in the final body. The above factors also determine surface area of carbon available for adsorption.

Some materials that are especially suited as fugitive materials are thermoplastics. Examples of thermoplastics are polymers which on carbonization in inert atmosphere break down into low molecular compounds and disappear without leaving any residue. Examples of these materials are polyester, polypropylene. One such thermoplastic polymer is a polypropylene which is supplied in the form of a monofilament by Glassmaster Inc., Lexington, S.C.

One suitable continuous fugitive material is polypropylene which can be in the form of fibers or screens. Fibers are supplied by Glassmaster, Lexington, S.C. Screens of various mesh sizes are supplied by Tetko, Inc. Briarcliff Manor, N.Y.

Any size, shape, or chemistry combination of channel-forming materials and filler materials can be used.

In accordance with one embodiment, a body is produced having a honeycomb structure which is formed from an array of fibers or a screen of channel-forming material.

Filler Additives

Additionally, filler material can be contacted with the resin and channel-forming material. The filler material can be pore-forming or support or combinations of the two types.

Pore-forming material is essentially the same as far as chemical composition as channel-forming material but the relative sizes and shapes of the two types vary. Material that will form flow thru-channels in a given size body is termed channel-forming for that body. Material that is not large enough in size to form channels in a given size body, but will form porosity is termed pore-forming material.

As with channel-forming materials, the pore-forming material is preferably non-wettable so that pores of clean and defined shape form on vaporization.

One material that is especially suited for use as pore-forming material in the practice of the present invention is finely powdered polymer fibers such as polyester flock supplied by International Filler Corp., North Tonawanda, N.Y., under the designation 31WPF. Flock is formed by grinding continuous fibers of thermoplastic material to very small size so that the material appears to be powdery. The fiber lengths in flock materials are typically less than about 150 micrometers.

As with channel-forming material, the nature, amount, size, and shape of the pore forming material are chosen depending on the desired size and amount of porosity desired in the final body. The above factors also determine surface area of carbon available for adsorption.

By non-fugitive or support is meant that the material is non-reactive, non-volatile, and remains essentially unchanged throughout the steps of the process and intact as part of the final product body, as opposed to fugitive or burnout materials. The non-fugitive material serves as a support for the carbon and contributes to the strength of the body. Some support materials are cordierite, e.g., cordierite powder, clays, glass powders, alumino-silicate, sand, and combinations of these. Some preferred support materials are cordierite, clays, glass powders, alumino-silicate and combinations of these. Especially preferred is cordierite powder because of its low cost when a casting process is used.

The support material can be in the form of a mat for especially good facility in shaping and to provide a closely knit or strong support for the resin and subsequently the carbon. The mat is made preferably from short fibers but in some cases longer fibers can be used to attain a given configuration in the final product body. Also for forming mats, it is preferred that the fibers be about 1–50 and more preferably about 2–10 micrometers in diameter. The mats are of low bulk density (high void volume). The void volume can vary from about 50% to about 98%. Preferred void volumes are about 75–95%.

It is preferred that the support mat be capable of absorbing at least about three times its weight and more preferably at least about five times its weight in resin when contacted therewith.

One preferred support mat is of alumino-silicate fibers, especially in the form of short fibers, such as Fiberfax 970 fiber mat supplied by Carborundum Niagara Falls, N.Y.

The resin is contacted with the channel-forming materials and with any fillers that are being used and the material is shaped into a green body. By green body according to the present invention is meant the shaped body before any curing of the resin. The contacting can be done by any technique designed to bring the materials together and form into the desired shape, such as for example dipping the solid components as the screens and fibers into the resin in static or continuous processing. Conventional molding techniques are well suited for the purposes of the present invention. The green body is heated to dry and cure the resin.

The drying is done to remove the liquid phases, e.g., solvents, etc., therefrom. The drying advances the resin to a non-tacky but still flexible state, commonly called the "B stage". At this stage, partial crosslinking in the resin takes place. The drying conditions of temperature and time are chosen depending on the combination and amounts of resin and support material although typical drying temperatures are in the range of about 80° C.–110° C. The drying conditions can be adjusted as necessary to achieve the "B" stage.

For example, in the case of phenolic resole resin, water, the solvent is removed by drying at about 80° C.–85° C., and then at about 100° C.–110° C. for a total time of up to about 3 hours. For example for a 2–3 mm thick sheet or mat of alumino-silicate fibers impregnated with resin, the drying time is about 1.5–2 hours at about 80° C.–85° C. and then about 20–30 minutes at about 100° C.–110° C. to obtain the flexible non-tacky state. At this stage if screens or mats both fugitive and non-fugitive are used or made, they can be further shaped if desired. For example the screens can then be cut, stacked, and the cut pieces pressed together to further shape the dried body, or they can be rolled, etc.

Some suitable techniques for contacting, shaping and drying are described below, although it is to be understood that the invention is not limited to such.

1) One technique is to form a wet mixture of all the components: resin, channel-forming material in the form of loose fibers, and optionally the fillers: pore-forming and/or support. The mixture can then be shaped by introducing the components into a mold.

Figure 9:
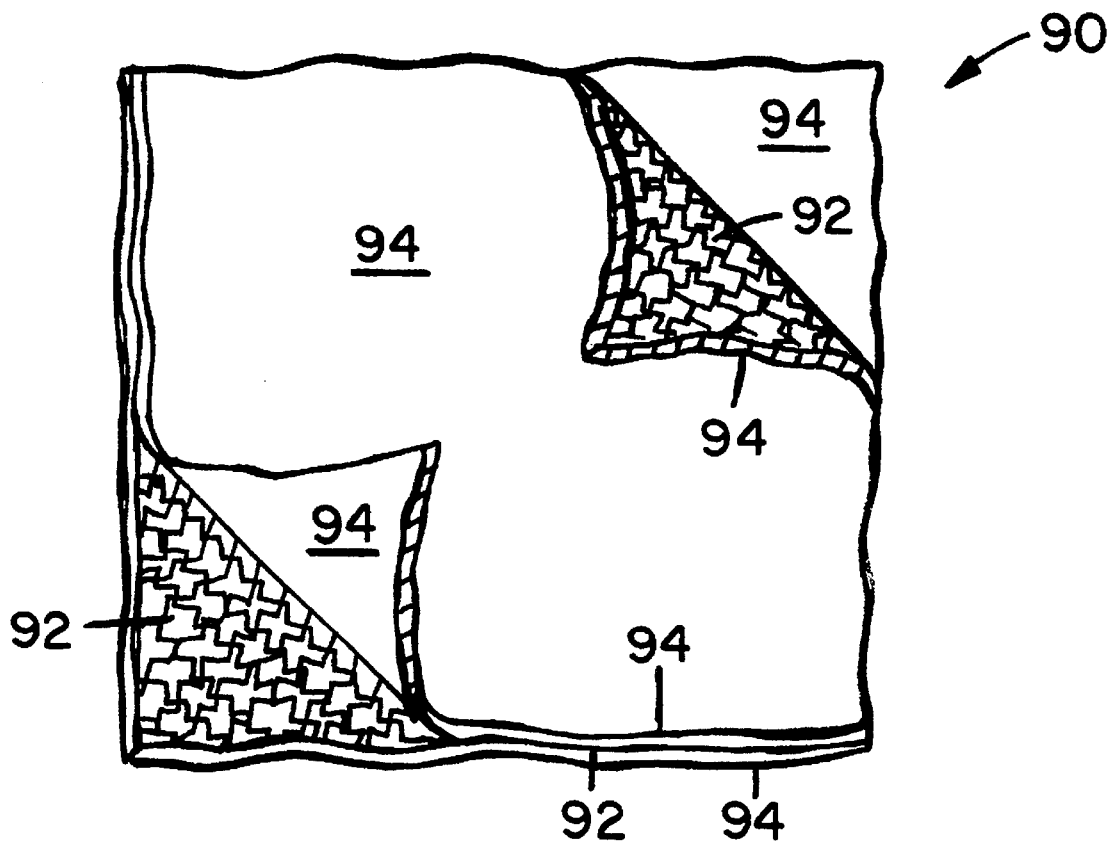
FIG. 9 shows resin in contact with a screen in the dried and still formable state.
Figure 10:
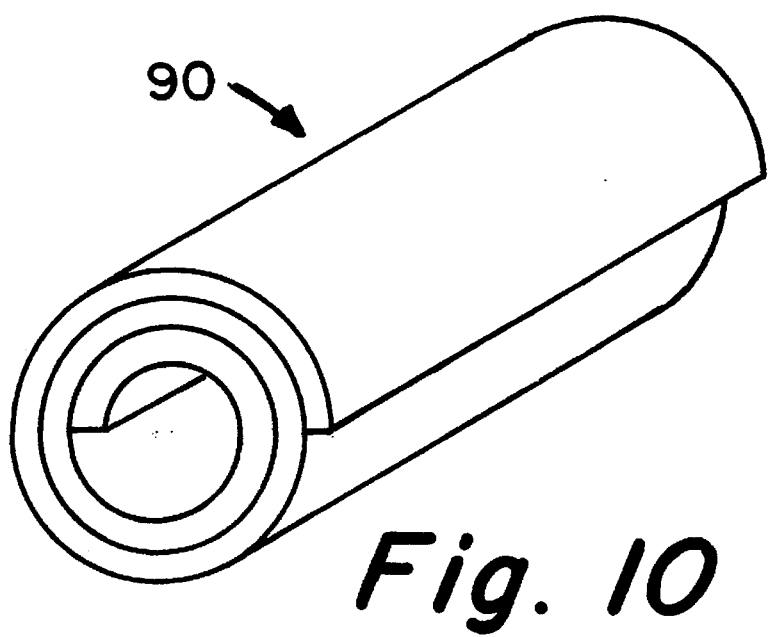
FIG. 10 shows the resin and screen shape of FIG. 9 further shaped into a roll.

2) Another technique is to use channel-forming fibers in the form of a screen, e.g., of thermoplastic polyester, polypropylene, etc. and optionally pore-forming material in the form of loose very short fibers, e.g., polyester flock, etc. In this case, the resin is mixed with the pore-forming material if used, and the mix is then poured into a mold in which the screen has been placed. FIG. 9 shows a dried body (90) having a screen (92) such as of the type shown in FIGS. 7 or 8 in contact with resin (94) which has been dried to the B stage. The dried resin and screen can be further shaped. FIG. 10 shows the further shaping of this dried body into a roll.

3) The resin can be mixed with a support material eg., cordierite powder, and this mix poured into a mold in which has been placed a structure of channel-forming material such as a screen.

4) The support material can be pre-shaped and then contacted with the resin. Channel-forming material can be pressed into the preshaped material. For example, resin can be contacted with a support mat e.g., of alumino-silicate, and dried, after which channel-forming fibers are pressed into the resin-support mat.

5) Channel-forming material can be pre-shaped and then contacted with the resin. Support material can be pressed into the preshaped material.

6) Channel-forming material in the form of a monofilament, e.g., made from a thermoplastic polymer as polypropylene can be pulled through a resin bath, e.g., a phenolic resin bath to coat the monofilament with the resin. Optionally, filler material pore-forming and/or support material and/or solid resin can be included in the resin bath. At this point, the resulting coated monofilament can optionally be passed through a die with a cylindrical hole to remove excess resin on the monofilament. In any case, the coated monofilament is then wound onto a drum with a flat or round cross section. In this way, layers of the monofilament can be built up on the drum by continuous winding. After the thickness of monofilament is built up to the desired level on the drum, the winding operation is discontinued and the layers are taken off the drum and can be further shaped such as by pressing, into the shaped green body. The green body dried and the resin cured. Alternately, the drying can be done on the drum. The dried form can then be further shaped if desired.

In some cases the support material, if used, can be first impregnated with a catalyst which is known to accelerate the curing reaction, and then mixed with the resin. On pouring into the mold, the resin becomes rigid and a cured body can be formed. An example of this process is the case of furan resin cured with catalysts such as $ZnCl_2$, PTSA (paratoluene sulfonic acid), citric acid, or some other catalyst.

If the shaping was done by molding, the mold with the green body is heated to dry the green body and cure the resin.

After the body has been shaped into the desired shape, the resin is then finally cured in the shaped form by heating under the specific temperature and time conditions required for the specific resin. This can be found in the manufacturer's literature. For example, for phenolic resole 43290 from Occidental Chemical Co. the body is heated in air to about 140°–155° C. The final temperature is attained slowly so that the body does not distort. For example, the body is first heated to about 90° C.–100° C., then to about 120° C.–130° C. and held at this temperature for about 1–2 hours. It is then heated to about 140° C.–155° C. and held for about 30 minutes–2 hours for final cure.

The rigid shape taken by the resin during the previously described shaping which is done at low temperatures, is not distorted during the curing.

Figure 4:
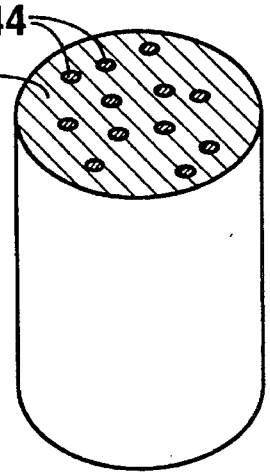
FIG. 4 shows a honeycomb body shaped from a mixture of resin and loose solid fibers or filaments, for example of the types shown in FIGS. 1 or 2.

FIG. 4 shows a honeycomb body (40) shaped from a mixture of resin (42) and loose solid fibers or filaments (44) for example of the types shown in FIGS. 1 or 2.

The resulting cured resin shaped body is then carbonized and activated to convert the resin to activated carbon. The carbonization also results in removal of the fugitive materials to form the respective shapes of channels and wall porosity.

The carbonization is carried out by heating the body in an inert or reducing atmosphere such as nitrogen or argon or forming gas. Forming gas is a mixture of nitrogen and hydrogen. Typical mixtures by volume are 92:8 or 94:6 $N_2:H_2$, although any mixtures can be used. Carbonization temperatures are about 600° C.–1000° C. or more typically about 700°–1000° C. for a length of time of usually about 1–20 hours. While the body is in the temperature range of about 300°–600° C., the fugitive materials vaporize. During carbonization low molecular weight compounds separate out and carbon atoms form graphitic structures. For example for phenolic resole resin 43290 from Occidental Chemical Co. and Furan Furcarb resin from QO Chemicals, carbonization is done by heating at a rate of about 150° C./hr in $N_2$. The temperature is held at about 900° C. for about 6–10 hours to complete the carbonization. The temperature is then reduced to 25° C. at a cooling rate of about 150° C./hr. On carbonization, the body contains random three dimensional oriented graphitic platelets with amorphous carbon between the platelets.

Figure 5:
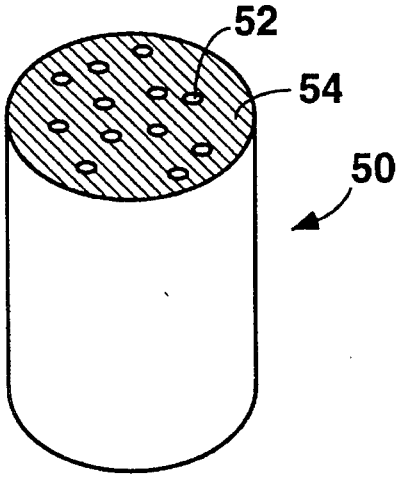
FIG. 5 shows the honeycomb of FIG. 4 after carbonization.

FIG. 5 shows the honeycomb of FIG. 4 after carbonization (50). The channel forming material has burned out to leave flow through channels (52) in the carbon structure (54).

Figure 6:
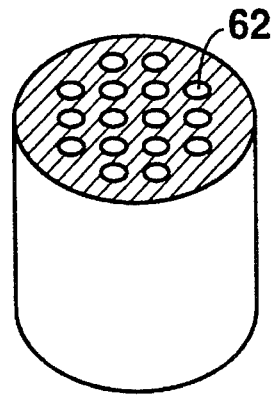
FIG. 6 shows a carbonized honeycomb body made using hollow tubular filaments, for example of the type shown in FIG. 3.

FIG. 6 shows a carbonized honeycomb body (60) made using hollow tubular filaments for example of the type shown in FIG. 3. The tubular filaments have burned out to leave the channels (62).

The carbon in the body is then activated by partially oxidizing in a suitable oxidant such as $CO_2$, steam, air, or a combination of these, etc. Activation can be carried out at temperatures between about 700° C.–1000° C. Activation conditions depend on type and amount of resin, flow rate of gas, etc. For example for phenolic resole and Furcab resins activation conditions are at about 900° C. for about 1 hour in $CO_2$ at a flow rate of about 14.2 l/hr. (about 0.5 CFH (cubic feet per hour)). The partial oxidation during activation causes the removal of the amorphous carbon and the formation of molecular size porosity between the graphitic platelets. This porosity and the graphitic platelets impart the adsorption characteristics to the resulting activated carbon body.

In accordance with another embodiment, resin-containing mats having pore-forming material can be broken up in granules of various sizes suitable to the application. Breaking up of the mats is done at any point in the process after curing. For example, it can be done either after curing and before carbonizing, or after carbonizing and before activating, or after activating. The granules are then subjected to the remainder of steps thru activation to form a carbon composite. Such granules have high surface area due to the pores formed on the burn-out of the pore-forming material.

The activated carbon body of the present invention is a continuous carbon structure and thus is high in strength.

To more fully illustrate the invention, the following non-limiting examples are presented. All parts, portions, and percentages are on a weight basis unless otherwise stated.

Example 1

Continuous polypropylene fibers were introduced into liquid phenolic resole and the resulting mixture was then dried and cured at about 80° C. for about 2 hours, about 100° C. for about 1 hour, and about 150° C. for about 30 minutes. The compact solid was then carbonized at about 900° C. for about 6 hours in nitrogen. At the end of carbonization, the compact was a honeycomb structure with continuous paths in place of the polypropylene fibers. The carbon was then activated at about 900° C. for about 1 hour in carbon dioxide. The 1" (2.54 cm) diameter×1" (2.54 cm) long honeycomb had a butane adsorption capacity of about 800 mg.

Example 2

A mixture of phenolic resole resin 43290 from Occidental Chemical Co., a solid phenolic powder from the same company No. 7716, and polyester flock (finely powdered polymer fiber 31WPF from International Filler Corp), in the weight ratio of 77.4%, 15.5%, and 7.2% respectively was made and poured into a mold containing continuous polypropylene fibers. The mold was then heated to about 80° C. and dried and then slowly heated to about 125° C. and held for about 1 hour and then heated in nitrogen to about 900° C. and held at that temperature for about 6 hours. During heat-up and carbonization both the polypropylene and the polyester fibers disintegrated and disappeared leaving holes behind. A honeycomb shape with straight parallel channels was thus formed. This honeycomb's walls were also porous allowing for maximization of surface area. This honeycomb was activated in carbon dioxide at about 900° C. This honeycomb of the same size as that in Example 1 gave a butane adsorption capacity of about 345 mg.

Example 3

A mixture of about 13.8% aluminosilicate Fiberfrax fiber from Carborundum Corp., about 14% Polyflock 31WPF from international Filler Corp., about 20.4% 7716, and about 51.8% 43290 phenolic resin from Occidental Chemical was poured into a mold containing polypropylene fiber of about 1 mm in diameter. The resin was cured at about 150° C. as in Example 2 and carbonized and activated as before to obtain a carbon honeycomb structure the same size as that of example 1. The butane adsorption capacity of this body was about 525 mg.

Example 4

A mixture of about 6.2% polyflock, about 13.8% 7716 solid phenolic resin and about 69% 43290 liquid phenolic resin from Occidental Chemical, and about 11% fiberfrax fiber from Carborundum was mixed and poured into a mold containing alternate 25 mesh and 200 mesh polypropylene screens from Tetko Inc. The samples were carbonized and activated as described above to obtain a honeycomb structure the same size as in the previous examples. The butane adsorption capacity was about 552 mg.

Example 5

Fiberfrax 970 mat from Carborundum Co. was dipped in resin and then allowed to dry at about 80° C. for about 2 hours and about 100° C. for about 1 hour. Polypropylene monofilaments as in Example 3 were then pressed into soft flexible mat and a preform was made by laying several mats together and pressing and heating to cure. The preform was carbonized and activated to obtain a honeycomb structure the same size as in the previous examples with adsorption capacity of about 829 mg of butane.

Example 6

A mixture of about 11% finely ground cordierite powder having an average particle size of about 10 micrometers in diameter, about 6% polyflock, about 13.6% 7716 resin and about 69.4% 43290 resin from Occidental Chemical was poured into a mold containing a 25 mesh polypropylene screen from Tetko Inc. The mold was heated to cure, carbonize, and activate the resin as in the previous examples. The body having the same size as in the previous examples had a butane adsorption capacity of about 565 mg.

The examples show that carbon structures with parallel flow paths can be made with controlled adsorption capacities. Depending on the requirements for the product and the economic considerations, carbon structures produced can be made to have different adsorption capacities.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for making an activated adsorbent carbon body having flow-through channels, said method consisting essentially of:

a) providing a crosslinkable resin;

b) providing continuous fugitive material wherein the temperature at which said continuous fugitive material begins to distort is greater than the curing temperature of the resin;

c) combining and shaping the continuous fugitive material and resin into a green body, and curing the resin;

d) carbonizing the resin and at the same time vaporizing the continuous fugitive material to form a carbon body having flow through channels in the configuration of the fugitive material; and e) heating the carbon body to activate the carbon and produce said activated carbon body.

2. A method of claim 1 wherein the resin is a thermosetting resin.

3. A method of claim 2 wherein the resin is selected from the group consisting of phenolic resins, furan, epoxies, and combinations thereof.

4. A method of claim 3 wherein the resin is selected from the group consisting of phenolic resins, furan, and combinations thereof.

5. A method of claim 3 wherein the resin is phenolic resole.

6. A method of claim 1 wherein the continuous fugitive material is selected from the group consisting of polyester, polypropylene, and combinations thereof.

7. A method of claim 1 wherein the continuous fugitive material is in a form selected from the group consisting of straight solid fibers, straight hollow fibers, curved solid fibers, curved hollow fibers, screens, and combinations thereof.

8. A method of claim 1 wherein prior to the curing step, filler material is contacted with the resin and continuous fugitive material, said filler material being selected from the group consisting of non-fugitive support material, non-continuous fugitive pore-forming material, and combinations thereof.

9. A method of claim 8 wherein the filler material is support material.

10. A method of claim 9 wherein the support material is selected from the group consisting of cordierite, clays, glass powders, alumino-silicate, and combinations thereof.

11. A method of claim 10 wherein the support material is in the form of an alumino-silicate mat.

12. A method of claim 8 wherein the filler material is pore-forming material.

13. A method of claim 12 wherein the pore-forming material is selected from the group consisting of polyester flock, polypropylene powder, and combinations thereof.

14. A method of claim 8 wherein the filler material is support material and pore-forming material.

15. A method of claim 14 wherein the support material is selected from the group consisting of cordierite, clays, glass powders, alumino-silicate, and combinations thereof, and the pore-forming material is selected from the group consisting of polyester flock, polypropylene powder, and combinations thereof.

16. A method of claim 15 wherein the support material is in the form of an alumino-silicate mat.

17. A method of claim 1 wherein the shaping is done by molding the resin and fugitive material in a mold.

* * * * *